United States Patent
Cowan et al.

(10) Patent No.: US 8,720,414 B2
(45) Date of Patent: May 13, 2014

(54) THROTTLE POSITION SENSOR ASSEMBLY

(75) Inventors: Nathan Cowan, Chatham (CA); John Norman Stockbridge, Waterford Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 365 days.

(21) Appl. No.: 13/335,308

(22) Filed: Dec. 22, 2011

(65) Prior Publication Data

US 2013/0160735 A1  Jun. 27, 2013

(51) Int. Cl.
*F02D 11/10* (2006.01)

(52) U.S. Cl.
USPC ......... 123/337; 123/399; 73/114.36; 251/305

(58) Field of Classification Search
CPC ........................... F02D 11/106; F02D 2011/10
USPC ......... 123/337, 399; 251/305–308; 73/114.36
See application file for complete search history.

(56) References Cited

U.S. PATENT DOCUMENTS

| | | | | |
|---|---|---|---|---|
| 5,178,433 A * | 1/1993 | Wagner | | 296/35.1 |
| 5,828,290 A * | 10/1998 | Buss et al. | | 338/162 |
| 6,439,058 B1 * | 8/2002 | Aratani et al. | | 73/756 |
| 6,508,454 B1 * | 1/2003 | Vanderveen et al. | | 251/214 |
| 7,117,844 B2 | 10/2006 | Kobayashi et al. | | |
| 8,450,999 B2 * | 5/2013 | Wolschlager et al. | ... | 324/207.25 |
| 8,584,549 B2 * | 11/2013 | Cheng et al. | | 74/500.5 |
| 2003/0084874 A1 * | 5/2003 | Rauch et al. | | 123/399 |
| 2008/0218158 A1 * | 9/2008 | Carlson et al. | | 324/207.2 |

* cited by examiner

*Primary Examiner* — Erick Solis

(57) ABSTRACT

Throttle body assemblies having improved throttle position sensing assemblies and a method of integrating a throttle position sensor assembly with a throttle body assembly are described. The method comprises the steps of: i) press-fitting a sensor element onto a shaft of a throttle plate of a throttle body assembly; ii) engaging one or more inwardly extending members of the sensor element with one or more recessed portions formed on the shaft of the throttle plate; and iii) disposing an inductive rotary position sensor proximate the sensor element, wherein the press-fit engagement and one or more inwardly extending members limit axial and rotational movement of the sensor element with respect to the throttle plate, and wherein the inductive rotary position sensor detects a relative position of the sensor element for the purpose of ascertaining a position of the throttle plate.

20 Claims, 2 Drawing Sheets

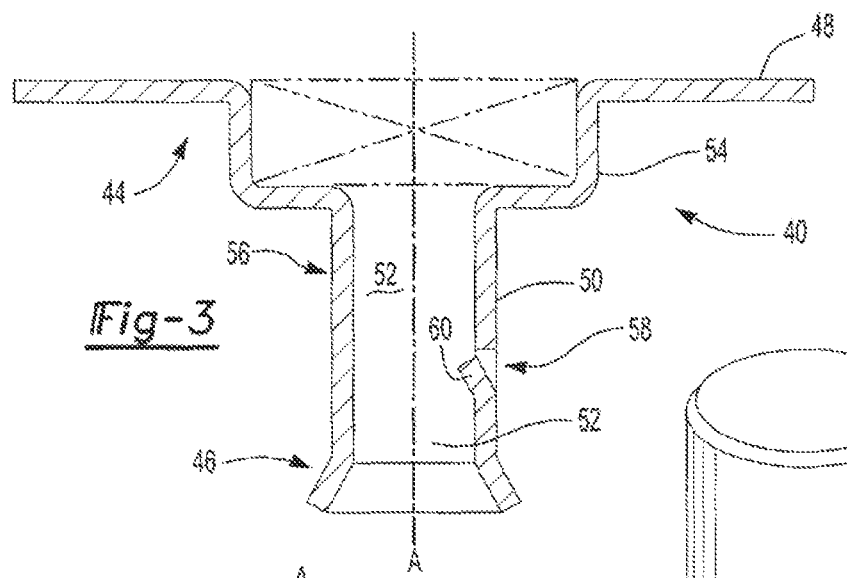
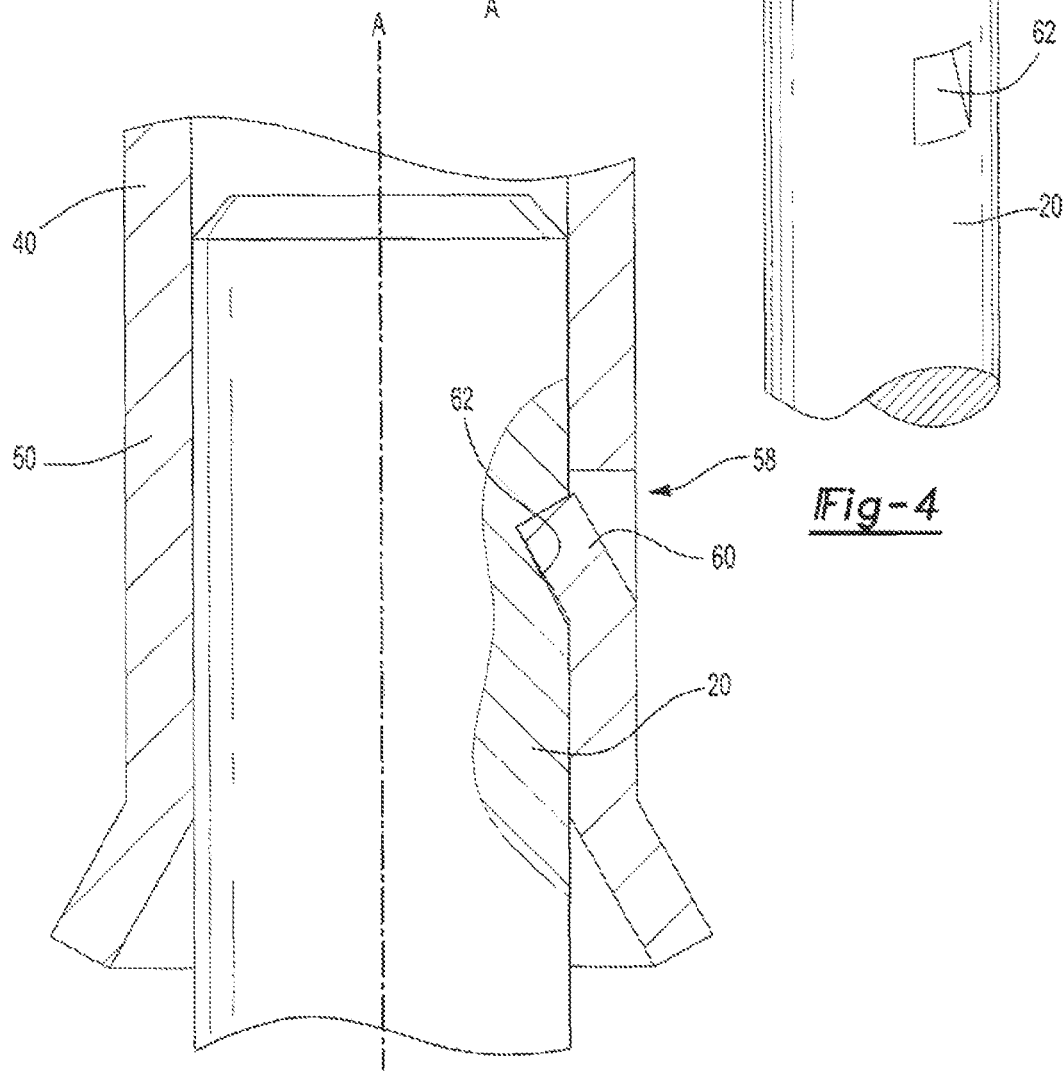

THROTTLE POSITION SENSOR ASSEMBLY

TECHNICAL FIELD

This patent relates to improved throttle body assemblies. More particularly, the patent relates to throttle body assemblies having improved throttle position sensing assemblies.

BACKGROUND OF THE INVENTION

Throttle body assemblies provide aspiration to engines. The aspiration to these engines is controlled through a throttle plate disposed in a bore of the throttle body assembly. The throttle plate is manipulated by a user of the engine to cause increase or decrease the flow of air to the engine thereby controlling power output.

As part of an overall engine control system, and in certain applications a vehicle control system, the operation of the throttle body assembly is monitored to provide vital information to the control system. For example, as part of an overall monitoring system of an engine, it is desirous to monitor the position of a throttle plate to ensure that the throttle body assembly is functional and performing properly. Also, by determining the position of the throttle plate it is possible to determine efficiency of the engine by comparing anticipated power output to actual power output.

In the past, position of the throttle plate has been determined using throttle position sensors. These sensors utilized induction formed between a component of the throttle plate and the throttle position sensor. More particularly, a detectable element is often mounted to a shaft in which the throttle plate has been mounted to and is placed in inductive relationship with a sensor element such that position of one or more components of the detectable element relates to a position of the throttle plate.

While these systems work generally well, there are still improvements necessary to improve performance and reduce cost of the throttle position sensor. In one aspect, the formation and attachment of a detectable element to the shaft of the throttle plate can be time consuming and costly. For example, it is necessary that the detectable element is particularly angularly aligned with respect to the throttle plate to ensure that readings from the sensor element correspond to actual positions of the throttle plate. It is also necessary that the detectable element is particularly aligned, with respect to a shaft of the throttle plate, to ensure that the surface of the detectable element is parallel with respect to the sensor element. Furthermore, it is highly important to ensure that detectable element maintains it position, both radially and axially, with respect to sensor element to prevent inaccurate readings or total failure of the throttle position sensor.

Prior methods to securely attach detectable elements to a throttle plate have involved the use of laser welding. However, the use of laser welding is difficult, time consuming and costly. Further, heat generated through laser welding could potentially warp the material of the detectable element, throttle plate shaft or both.

In view of the foregoing, there is a need for improved methods and devices for monitoring position of a throttle plate. More so, there is a need for improved methods and devices for the formation and attachment of throttle position sensor components to a throttle body assembly.

BRIEF DESCRIPTION OF THE DRAWINGS

FIG. 3 comprises a cross-sectional view of a detectable element of a throttle position sensor assembly according to various embodiments of the present invention.

FIG. 4 comprises a partial perspective view of a throttle plate shaft according to various embodiments of the present invention.

FIG. 5 comprises a partial cross-sectional view of a detectable element of a throttle position sensor assembly mounted to a throttle plate shaft according to various embodiments of the present invention.

DETAILED DESCRIPTION

Improved methods and devices for monitoring operation of throttle body assemblies are provided. In particular, improved methods and devices for the formation and integration of throttle position sensor components to a throttle body assembly are provided. The improvements are based, at least in part, upon formation and attachment techniques of a detectable sensor element to a shaft of a throttle plate.

In some aspects, a method of integrating a throttle position sensor assembly with a throttle body assembly comprises the step of press-fitting a sensor element onto a shaft of a throttle plate of a throttle body assembly. The method further comprises the step of engaging one or more inwardly extending members of the sensor element with one or more recessed portions formed on the shaft of the throttle plate. The method further comprises disposing an inductive rotary position sensor proximate the sensor element, wherein the press-fit engagement and one or more inwardly extending members limit axial and rotational movement of the sensor element with respect to the throttle plate, and wherein the inductive rotary position sensor detects a relative position of the sensor element for the purpose of ascertaining a position of the throttle plate.

In some aspects, a throttle position sensor assembly comprises an inductive rotary position sensor configured to monitor positions of a rotating member. The assembly further comprises a sensor element extending about an axis of rotation. The sensor element comprises a detectable member disposed at a first end of the sensor element which is detectable by the inductive rotary position sensor to determine rotational position thereof. The sensor element also comprises a mount for connection of the sensor element to a shaft of a throttle plate. The mount defines a bore extending along the axis of rotation and between the first end and a second end of the sensor element. The mount comprises one or more members extending into the bore and configured to engage corresponding recesses formed in the shaft of the throttle plate.

In some aspects, a throttle assembly for providing aspiration to an engine comprises a throttle body defining a bore for receiving a throttle plate to provide controlled aspiration to an engine, the throttle plate being driven through an electric motor. The throttle assembly further comprises a throttle position sensor assembly configured to monitor the position of the throttle plate within the throttle bore. The throttle position sensor comprises a sensor element mounted to the throttle plate. The sensor element defines a bore that forms a press-fit with a shaft of the throttle plate. The sensor element also comprises one or more inwardly extending members that engage recesses formed in the shaft. The throttle position sensor also comprises an inductive rotary position sensor configured to monitor the position of the sensor element and hence the position of the throttle plate.

Figure 1:
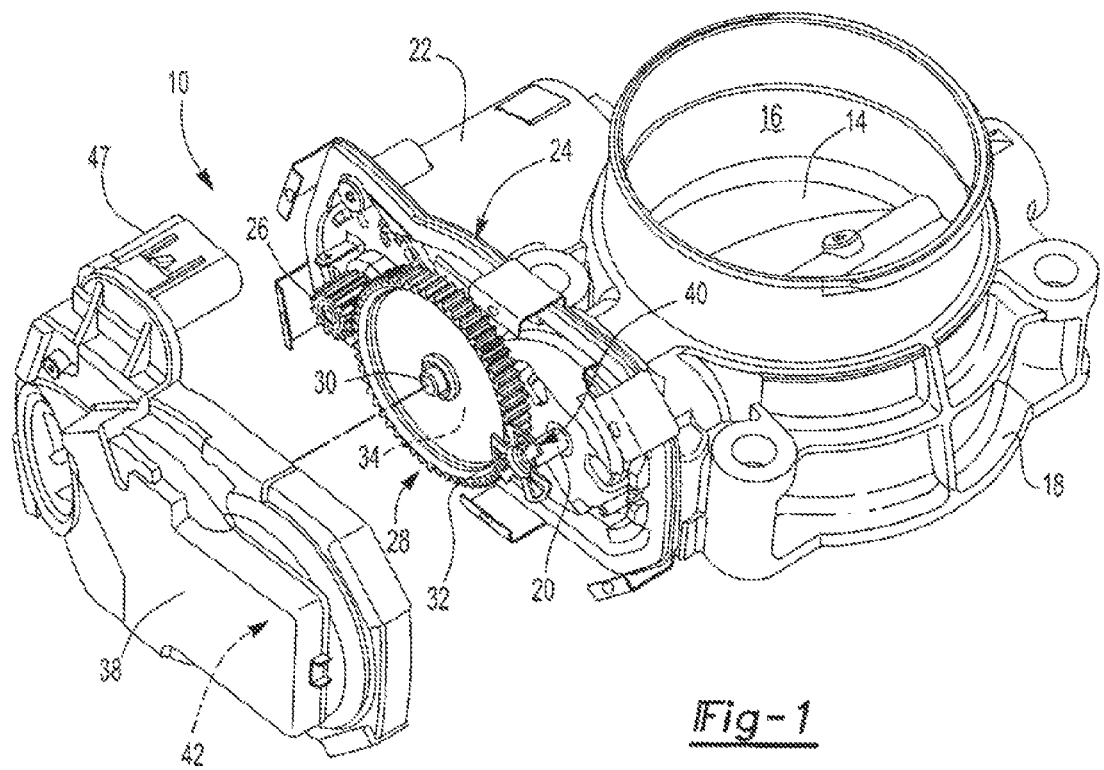
FIG. 1 comprises a partial exploded perspective view of a throttle body assembly according to various embodiments of the present invention.
Figure 2:
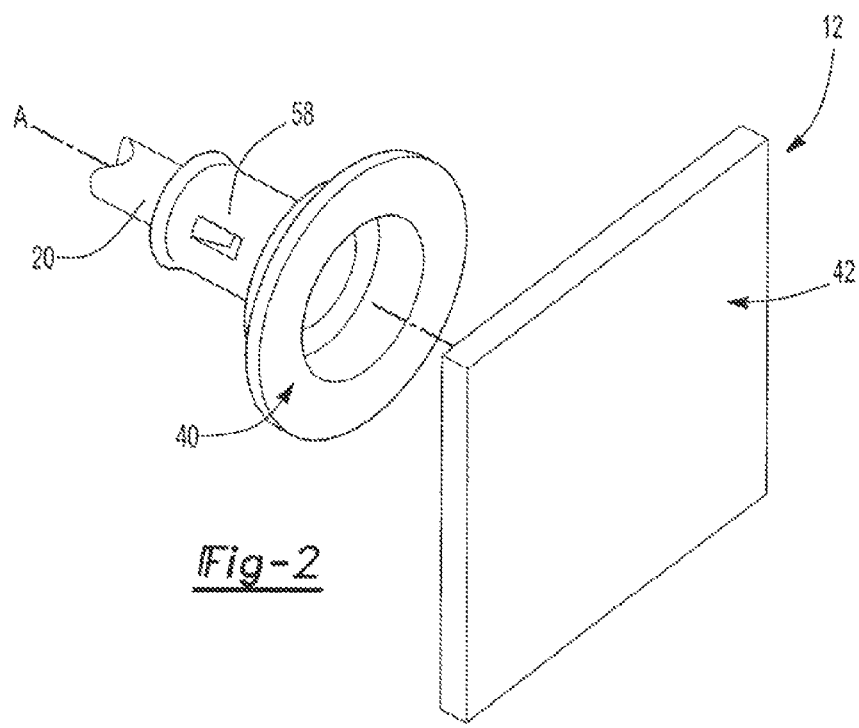
FIG. 2 comprises an exploded perspective view of a throttle position sensor assembly according to various embodiments of the present invention.

Referring to FIGS. 1 and 2, an exemplary throttle body assembly 10 and throttle position sensor assembly 12 are shown. The throttle body assembly 10 comprises a throttle plate 14 rotatably disposed in a throttle bore 16 formed through a throttle body housing 18. The throttle plate 14 is formed with or attached to a throttle shaft 20 which provides rotational attachment to the throttle body housing 18. The throttle plate 14 is rotatably moveable between an open position, where there is little impedance to the flow of air through the throttle bore 16, and a closed position, where there is substantial impedance to the flow of air through the throttle bore.

The throttle plate 14 is electrically driven by an electric motor 22, through a gear assembly 24. The gear assembly 24 comprises an electric motor gear 26 that provides rotational driving force to an intermediate gear assembly 28, which acts as a slave gear assembly, and is mounted to intermediate pin 30 which is supported by the throttle body housing 28. The intermediate gear assembly 28 comprises a first intermediate gear 32, which is in contact with electric motor gear 26, and a second intermediate gear 34, which is in contact with and provides driving force to a throttle plate gear 36, which is mounted to throttle shaft 20. The gear assembly is protected and covered by gear cover 38.

Referring more particularly to FIGS. 2 through 5, the throttle body assembly 10 comprises throttle position sensor assembly 12 that is configured to monitor operation of the throttle body assembly 10. More particularly, the throttle position sensor assembly 12 monitors the position of the throttle plate 14 so that the relative open and closed position can be determined. Determining the relative open and closed position of the throttle plate 14 may be used to confirm functionality of the throttle body assembly 10 and also calculate anticipated air flow to an associated engine to further determine performance, efficiency, or otherwise, of the engine. The positioning of the throttle plate 14 may also be used for other purposes such as for controlling the electric motor 22 or otherwise.

In some aspects, the throttle position sensor assembly 12 comprises an inductive rotary position sensor. In these aspects, the throttle position sensor assembly 12 comprises a sensor element 40 that is disposed with respect to a inductive rotary position sensor 42, the inductive rotary position sensor being mounted and supported by the gear cover 38, so as to be in an electrically inductive relationship therewith. In an example, the inductive rotary position sensor 42 detects movement and position of the sensor element 40, which is compared to reference data to determine the position of the throttle plate 14. The information generated by the inductive rotary position sensor 42, which in an example is sensed by a sensor board that is in communication with a sensor processor, is transmitted to a monitor or control unit of the throttle body assembly, engine, or vehicle through connector 47.

In some aspects, the sensor element 40 comprises multiple mechanical attachments means that substantially limits or prevents axial and rotational movement of the sensor element, with respect to an attached throttle plate, during operation of the throttle body assembly. Further, as opposed to prior attachment means, the attachment means provide lower cost and more reliable attachment of a sensor element 40 to a throttle plate 14 than certain prior attachment means.

As an overview, the sensor element 40 extends along an axis 'A' and between a first end 44 and a second end 46. The first end 44 is configured to be placed in an inductive relationship with the inductive rotary position sensor 42 and comprises an annular lip 48 extending about the axis 'A'. The annular lip 48 is suitably shaped for detection by the inductive rotary position sensor 42. The sensor element 40 further comprises an annular wall 50 defining a bore 52. The annular wall 50 and bore 52 extend radially about and along axis 'A' and between the first and second end 44, 46 of the sensor element. The annular wall 50 is configured for connecting the sensor element 40 to the throttle shaft 20 and is connected to annular lip 48, via wall members 54.

In some aspects, the sensor element 40 comprises a first attachment means 56 disposed in a first zone at the second end 46 and a second attachment means 58 disposed in a second zone between the first and second ends 44, 46 of the sensor element.

In some aspects, the first attachment means 56 comprise a press-fit formed between the annular wall and the throttle shaft 20. In particular, the annular wall 50 comprises an interior diameter that is less than an exterior diameter of the throttle shaft 20.

In some aspects, the second attachment means 58 comprises one or more, or plurality, of individual attachment means 60. In an example the second attachment means 58 comprises one or more, or plurality, of snap-fittings formed between the annular wall 50 of the sensor element 40 and the throttle shaft 20.

In an example, the individual attachment means comprises one or more, or plurality, of piercings formed through the annular wall 50 that extend into recesses 62 formed in the throttle shaft 20. However, it should be appreciated that the piercings may form a snap-fit configuration. It is contemplated that the individual attachment means comprise, or is formed of, flexible, resilient and/or moveable material to able to be deflect during attachment and/or removal of the sensor element 40 from the throttle shaft 20.

In an example, the one or more individual attachment means 60 extend into the bore 52 of the sensor element 40 to engage corresponding features, e.g. recesses 62 or otherwise, of the throttle shaft 20. In an example, with multiple individual attachment means 60, the means and corresponding structures, e.g. recesses 62 or otherwise, of the throttle shaft 20 are formed about the sensor element axis 'A' and in one particular configuration substantially equally spaced from one another.

The first and second attachment means 56, 58 limit or substantially limit movement of the sensor element 40 with respect to the throttle shaft 20. For example, the first attachment means 56, e.g. press-fit, limits or prevents both axial movement of the sensor element 40 along the throttle shaft 20 and limits or prevents radial movement about the sensor element axis 'A'. The second attachment means 58, e.g. one or more inwardly extending individual attachment means 60, limits or prevents both axial movement of the sensor element 40 along the throttle shaft 20 and prevents radial movement about the sensor element axis 'A'. It has been found that this configuration provides a low cost and reliable means for attachment of the sensor element 40 to a throttle shaft 20.

The sensor element 40 may be formed using any suitable forming technique. However, in some aspects, the sensor element is formed using cold forming techniques, which provides low cost forming and improved tolerances. In an example the sensor element 40 is formed using a deep drawing process, which is an effective way of forming the various features of the sensor element 40 and in some aspects the bore 52. In an example, the sensor element is formed using a stamp or pressing mechanism such as similarly performed in an eyelet forming mechanism. It should be appreciated that other, both cold and hot, forming techniques can be used. In some aspects, the sensor element 40 is formed from a single piece of material to form integrally formed unitary structure. The formed sensor element 40 comprises a material thickness of approximately 0.5 mm. Further, in some aspects the sensor element is formed of a high strength, resilient and flexible material. Examples of suitable material comprises metal, certain plastics or otherwise.

With respect to the throttle shaft 20, the recesses 62 are formed advantageously to correspond to the engagement features, i.e. second attachment means 58, of the sensor element 40. The recesses 62 may comprise holes, openings, grooves, shoulders, notches or other engagement features for engagement with the individual attachment means 60. In some aspects the recesses 62 are formed through a milling process of the throttle shaft 20. In some aspects the recesses 62 are formed through a grinding or other machining process. In either regards, in some aspects the recesses 62 form flat angular surfaces in the throttle shaft 20.

A method of integrating a throttle position sensor assembly 12 with a throttle body assembly 10 is further contemplated. The method comprises forming a sensor element 40 through the techniques as described herein. Forming one or more piecing, e.g. individual attachment means 60, through the annular wall 50 to cause members of the sensor element 40 to extend into the bore 52. The bore 52 formed through the sensor element 40 is then aligned with throttle shaft 20 and placed onto the shaft. An inductive rotary position sensor 42 is placed proximate to the sensor element to detect a relative position of the sensor element for the purpose of ascertaining a position of the throttle plate. During placement, the individual attachment means 60 extend into corresponding recesses 62 formed in the throttle shaft 20 to limit or prevent movement of the sensor element 40 with respect to the throttle shaft.

During formation of the sensor element 40, formation of the bore 52, formation of the attachment means 56, 58, formation of the recesses 62 and/or attachment of the sensor element to the throttle shaft 20 is performed using a cold process, i.e. without the use of additional of heat, such as welding or otherwise, so as to prevent or limit deformation of throttle body assembly 10 components, including the throttle position sensor assembly 12.

Preferred embodiments of this invention are described herein, including the best mode known to the inventors for carrying out the invention. It should be understood that the illustrated embodiments are exemplary only, and should not be taken as limiting the scope of the invention. It will also be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

What is claimed is:

1. A method of integrating a throttle position sensor assembly with a throttle body assembly, the method comprising the steps of:
    press-fitting a sensor element onto a shaft of a throttle plate of a throttle body assembly;
    engaging one or more inwardly extending members of the sensor element with one or more recessed portions formed on the shaft of the throttle plate; and
    disposing an inductive rotary position sensor proximate the sensor element,
    wherein the press-fit engagement and one or more inwardly extending members limit axial and rotational movement of the sensor element with respect to the throttle plate, and
    wherein the inductive rotary position sensor detects a relative position of the sensor element for the purpose of ascertaining a position of the throttle plate.

2. The method of claim 1, wherein the sensor element defines a bore extending between a first end and a second end of the sensor element, the bore includes an interior diameter that is less than an exterior diameter of the shaft in which the sensor is press-fit to.

3. The method of claim 2, wherein the bore includes a first zone where the one or more inwardly extending members engage the one or more recessed portions, the first zone being disposed proximate the second end of the sensor element, and wherein the bore includes a second zone where the press-fit engagement is formed, the second zone being disposed between the first and second end of the sensor element.

4. The method of claim 1, wherein the one or more inwardly extending members are flexible, resilient and moveable within the bore.

5. The method of claim 1, wherein the sensor element comprises an integrally formed unitary structure formed substantially from a single piece of material.

6. The method of claim 5, wherein the sensor element is formed of a metal material and comprises a material thickness of about 0.5 mm.

7. The method of claim 6, wherein the bore of the sensor element is formed through a deep drawing process.

8. The method of claim 2, wherein the one or more inwardly extending members are formed through one or more piercings made through walls defining the bore.

9. The method of claim 8, wherein the one or more recessed portions comprise flat notches formed on the shaft.

10. The method of claim 8, wherein the one or more recessed portions comprise groves formed on the shaft.

11. The method of claim 2, wherein the sensor element comprises a plurality of inwardly extending members that are generally equally spaced about an axis of the bore, the plurality of inwardly extending members engaging a corresponding plurality of flat notches formed on the shaft.

12. The method of claim 1, wherein the inductive rotary position sensor is disposed in a gearbox cover of the throttle body assembly.

13. A throttle position sensor assembly, comprising:
    an inductive rotary position sensor configured to monitor positions of a rotating member; and
    a sensor element extending about an axis of rotation, the sensor element comprising:
        a detectable member disposed at a first end of the sensor element which is detectable by the inductive rotary position sensor to determine rotational position thereof, and
        a mount for connection of the sensor element to a shaft of a throttle plate, the mount defining a bore extending along the axis of rotation and between the first end and a second end of the sensor element, the mount comprising one or more members extending into the bore and that are configured to engage corresponding recesses formed in the shaft of the throttle plate.

14. The throttle position sensor assembly of claim 13, wherein the bore includes a first zone having the one or more inwardly extending members, the first zone being disposed at the second end of the sensor element, and wherein the bore includes a second zone having a generally consistent diameter capable of forming a press-fit engagement with correspondingly shaped component, the second zone being disposed between the first and second end of the sensor element.

15. The throttle position sensor assembly of claim 14, wherein the one or more inwardly extending members are flexible, resilient and moveable within the bore.

16. The throttle position sensor assembly of claim 13, wherein the sensor element comprises an integrally formed unitary structure formed substantially from a single piece of material.

17. The throttle position sensor assembly of claim 13, wherein the sensor element comprises a plurality of inwardly extending members that are generally equally spaced about the axis of the bore.

18. A throttle assembly for providing aspiration to an engine, the throttle assembly comprising:
   a throttle body defining a bore for receiving a throttle plate to provide controlled aspiration to an engine, the throttle plate being driven through an electric motor; and
   a throttle position sensor assembly configured to monitor the position of the throttle plate within the throttle bore, the throttle position sensor comprising:
      a sensor element mounted to the throttle plate, the sensor element defining a bore that forms a press-fit with a shaft of the throttle plate, the sensor element comprising one or more inwardly extending members that engage recesses formed in the shaft, and
      an inductive rotary position sensor configured to monitor the position of the sensor element and hence the position of the throttle plate.

19. The throttle assembly of claim 18, wherein the bore includes a first zone having a plurality of inwardly extending members engaging a corresponding plurality of recesses formed in the shaft, the first zone being disposed at the second end of the sensor element, and wherein the bore includes a second zone having a generally consistent diameter capable of forming the press-fit with the shaft, the second zone being disposed between the first and second end of the sensor element.

20. The throttle assembly of claim 19, wherein the sensor element comprises an integrally formed unitary structure formed substantially from a single piece of material, and wherein the plurality inwardly extending members are flexible, resilient and moveable within the bore.

* * * * *